Nov. 30, 1965    J. E. JENDRISAK    3,220,819
HOLD DOWN DEVICE FOR GLASS BENDING MOLD
Original Filed March 29, 1960    2 Sheets-Sheet 1

INVENTOR
Joseph E. Jendrisak
BY McCoy, Greene, Medert
 + Te Grotenhuis
ATTORNEYS

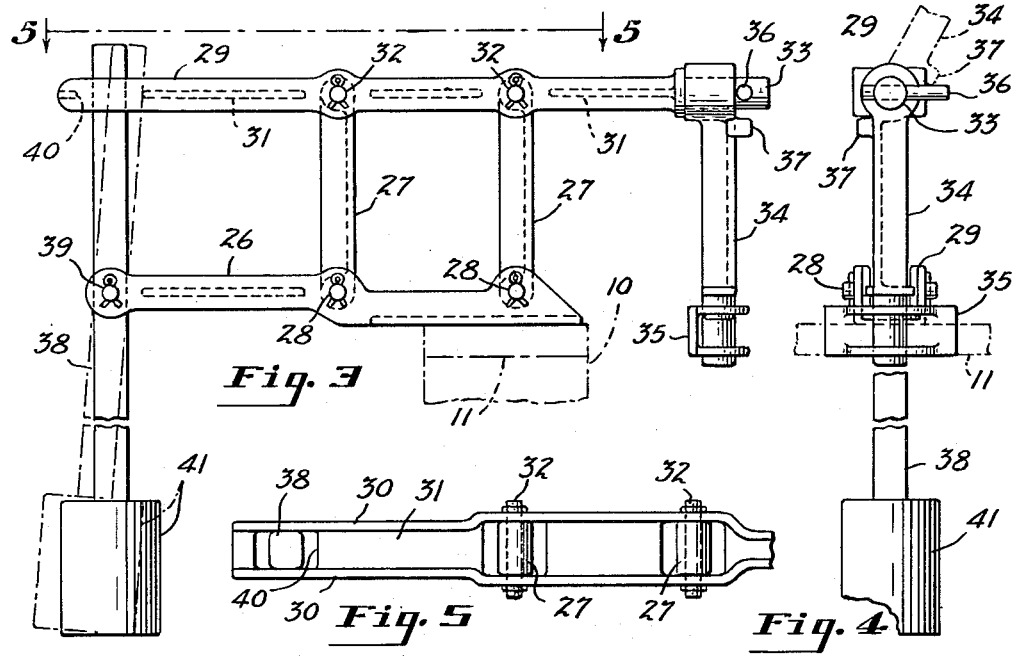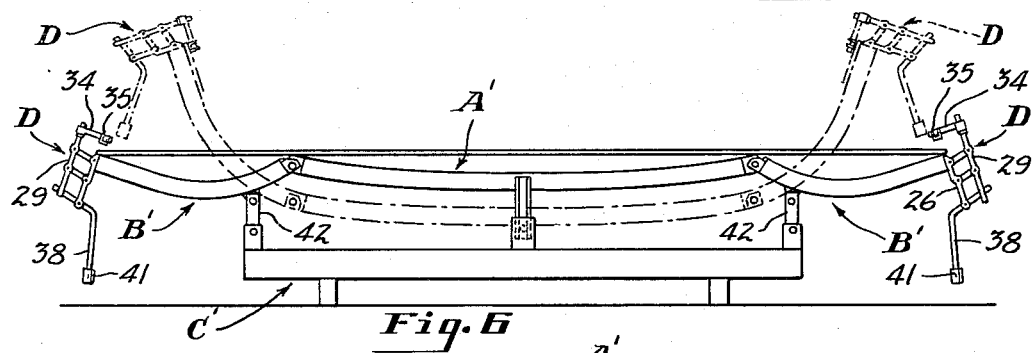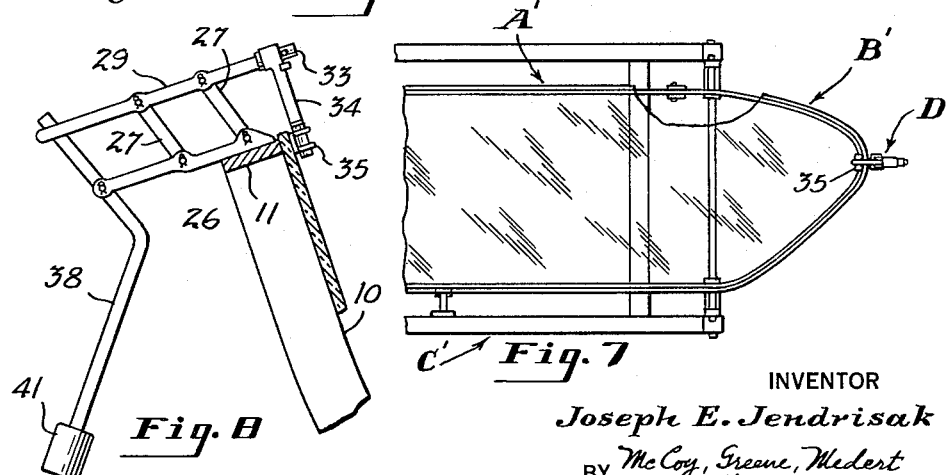

United States Patent Office 3,220,819
Patented Nov. 30, 1965

3,220,819
HOLD DOWN DEVICE FOR GLASS
BENDING MOLD
Joseph E. Jendrisak, Northville, Mich., assignor to Shatterproof Glass Corporation, Detroit, Mich., a corporation of Delaware
Original application Mar. 29, 1960, Ser. No. 18,288, now Patent No. 3,189,426, dated June 15, 1965. Divided and this application May 20, 1964, Ser. No. 368,942
The portion of the term of the patent subsequent to Sept. 10, 1980, has been disclaimed
2 Claims. (Cl. 65—290)

This application is a division of my copending application Serial No. 18,288, now U.S. Patent No. 3,189,426, and a continuation-in-part of U.S. Patent No. 3,103,430, which was copending with application Serial No. 18,288.

This invention relates to the bending of sheet glass to form curved glass windshields and the like and more particularly to an improved hold down device to be used in apparatus for shaping or molding glass panes that have been softened by application of heat.

In the manufacture of curved windshields and rear windows for automobiles the deeply bent glass sheets are shaped by so supporting them above concave molds that have narrow perimetric upwardly facing glass engaging faces that the heat softened glass sheets sag into contact with and conform to the glass engaging faces.

In the manufacture of safety glass windshields a sheet of thin transparent plastic is sandwiched between and adhered to two superposed sheets of glass. In order to obtain exact conformity between the two curved glass sheets and avoid defects in the finished product, the two sheets that are to be laminated are matched by simultaneously shaping them one on top of the other on a glass bending mold.

Molds for forming deeply bent windshield or rear window glass for automobiles are commonly made up of sections articulated end to end and having end sections that are joined to the center section of the mold adjacent portions of the mold where the curvature is greatest. The end sections swing vertically and upwardly from a glass receiving position where rigid sheets of glass may be supported by the mold in substantially horizontal position, to a molding position where the upwardly facing concave shaping surface of the mold has the shape to which the glass is to be bent. Such molds are shown and described in my U.S. Patent No. 3,103,430, and in my U.S. patent application Serial No. 18,288.

The molds, with the glass to be bent supported thereon, are passed through a lehr in which the temperature is controlled to provide zones of gradually increasing temperature varying from about 600° F. to approximately 1,300° F. and the molds are so supported on racks or cradles that the weight of the mold sections tends to hold the mold in closed position but the flat glass panes supported on the opened mold sections holds the mold in open position until the glass is sufficiently softened by heat to permit the mold to close. In molds having sharply bent ends, the end sections swing through a relatively large angle from the flat glass supporting position to the mold closing position and the change in angular position during the closing of the mold is apt to cause unequal bending and imperfect matching of the two sheets of glass being bent.

Most of the defects in the bent glass which become apparent during the subsequent laminating operation or which appear after the glass has been installed in an automobile, are attributable to the forces exerted on the glass during the bending operation.

In the bending of windshields and rear windows that have a deep bend, the end portions may tend to curl away from the shaping surface of the mold due in part to the more rapid heating at the end portions and to the reduced weight that is imposed in a direction normal to the windshield as the end sections approach the molding position.

The present invention provides improved means for holding the ends of the glass sheets in engagement with one another and in contact with the molding surface during the major portion of the movement of the bending mold from its open glass receiving position to its closed molding position. Thus, the present invention assures the proper engagement of the ends of the superposed glass sheets to be bent with one another and with the ends of the mold.

The hold down device embodied in the invention is mounted on the mold end sections and utilizes a pivoted counterweight which is mechanically linked to a glass engaging shoe so that the shoe is positioned away from the glass when the mold is in its open glass receiving position and swings to a glass engaging position in response to movement of the counterweight as the mold approaches its closed molding position. This prevents objectionable curling at the outer ends of the glass sheets.

It is an object of the present invention to provide an improved means for urging the end portions of heat-softened glass sheets toward the shaping surface of a glass bending mold during the final portion of a glass bending operation. As in my above mentioned patent and application, the hold down may be used with a mold for a whole or a half windshield or for other bending of sheet glass such as for automobile back lites. The improved hold down structure is shown as used on a mold for a one-half windshield.

Other objects and advantages will be apparent from the following description and drawings forming a part of the specification wherein like parts are identified by like numerals and wherein:

FIGURE 3 is a fragmented side elevation of one of the hold downs shown in FIGURE 1;

FIGURE 4 is a fragmented end elevation of the hold down shown in FIGURE 3;

FIGURE 5 is a partial elevational view taken from the line 5—5 of FIGURE 3;

FIGURE 6 is a side elevation of a full windshield bending mold having a hold down embodying the invention mounted on each end section and showing the mold in open glass receiving position in solid lines and in closed molding position in dashed lines;

FIGURE 7 is partial top plan view of the mold shown in FIGURE 6; and

FIGURE 8 is a fragmentary longitudinal view of the mold shown in FIGURE 6 showing the hold down in its glass engaging position.

Figure 1:
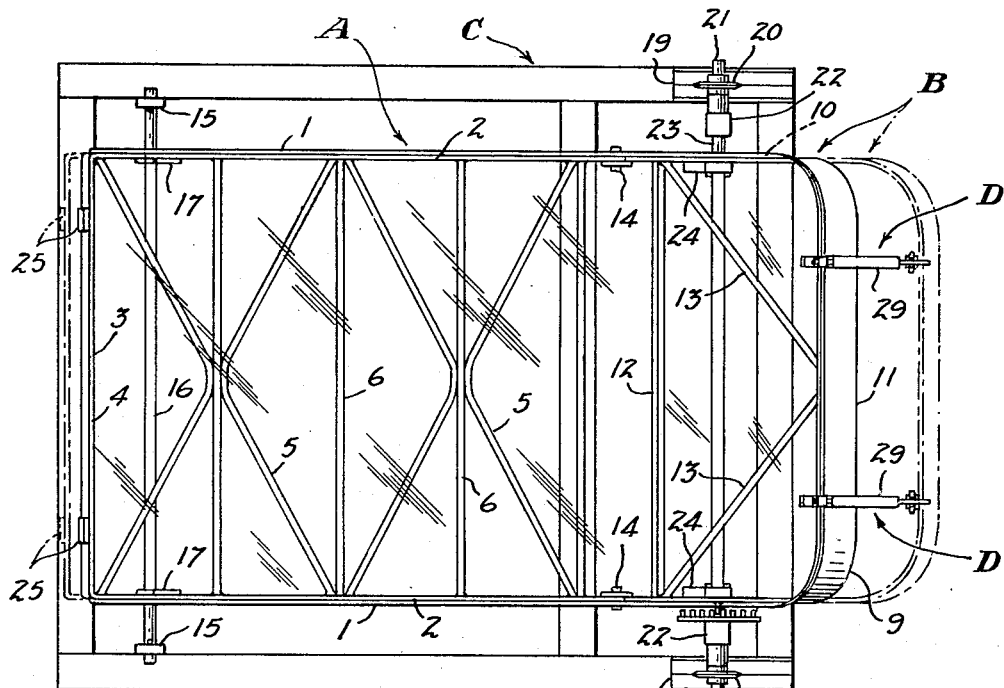
FIGURE 1 is a top plan view of a two section mold for bending a half windshield and having two hold downs embodying the invention.
Figure 2:
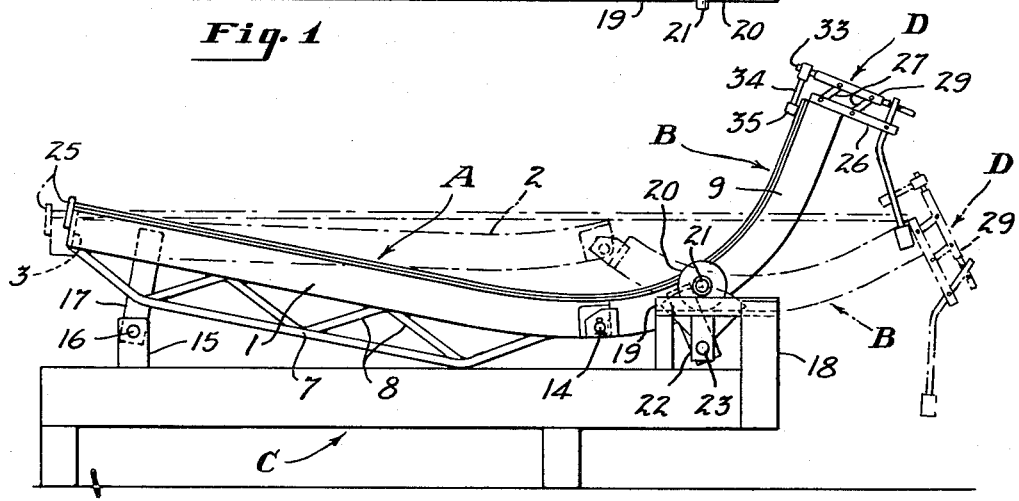
FIGURE 2 is a side elevation of the mold shown in FIGURE 1.

Referring more particularly to the drawings, FIGURES 1 and 2 show a half-windshield mold for use in bending heat-softened glass sheets, which utilizes hold downs embodying the present invention. The mold generally comprises a main section A, pivotable about a fixed axis, an end section B hinged to the main section A, and pivotable about a movable axis, a cradle C which supports the sections A and B, and two hold downs D mounted on the end section B. The mold structure shown is identical to the half-windshield mold shown and described in my copending U.S. application, Serial No. 18,288.

The section A is formed with side rails 1 in the form of flat steel bars that provide narrow top edges 2 for engagement with the glass. The edges 2 are nearly straight but usually are slightly concave longitudinally. At one end the rails 1 are connected to an end rail 3 at substantially right angles thereto and having a top edge 4 that is flush with the top edges of the rails 1. The rails 1 are connected by diagonal and perpendicular cross braces 5 and 6 that are welded or otherwise suitably secured to the rails 1 near their bottom edges. The side rails 1 are preferably provided with truss-like reinforcing means in the form of tension chords 7 attached to the lower edges of the rails 1 adjacent their ends and connected to the rails 1 intermediate their ends by short connecting braces 8.

The end section B has a marginal rail 9 of the same cross sectional dimensions as the rails 1, the ends of which abut the free ends of the rails 1 when the mold is closed, the rail 9 having a top glass engaging edge 10 which, with the top edges 2 and 4 of the rails 1 and 3, forms the marginal glass shaping surface of the mold. As herein shown, the rail 9 has a central portion 11 at substantially right angles to its end portions to conform to a wide end windshield. A cross brace 12 is attached to the rail 9 adjacent its ends and extends across the space between said ends. A V-shaped brace 13 is attached at its apex to the portion 11 of the rail 9 centrally thereof and at its ends to the rail 9 adjacent the cross brace 12. The ends of the rail 9 are connected to the rails 1 by coaxial pivots 14 such as those shown and described in my copending U.S. patent application Serial No. 18,288.

A pair of flat glass sheets to be bent is supported in substantially horizontal position on the ends of the marginal glass shaping surface of the mold and upon intermediate portions of the glass shaping surface adjacent the pivots 14. The sections collapse with the sagging of the glass sheets supported thereon to the closed or molding position of the mold. The pivots 14 are offset with respect to the end faces of the rails 1 and 9 that abut when the mold is closed so that the end of the glass engaging edge of one rail adjacent each pivot 14 remains above the other during the movement of the mold from its open glass receiving position to its closed position where the molding edges form a continuous line. The mold sections are so mounted on the supporting cradle that the pivotally connected ends of the sections have substantially vertical movement to and from closed position. In order to provide such movement the two mold sections are preferably mounted for rocking movement on the supporting cradle. The section A is supported on bearing brackets 15 carried by the cradle positioned beneath the end thereof remote from the pivotal connection between the sections by means of axially alined horizontal pivots 16 connecting the brackets 15 to arm 17 fixed to the rails 1 and extending downwardly therefrom.

The section B is supported for vertical rocking and longitudinal movements on the cradle C. The cradle C has standards 18 that support horizontal V-shaped tracks or ways 19 on opposite sides of the section B and the section B is supported for longitudinal movement with coaxial rollers 20 that travel on the tracks 19 and for swinging movement about the axis of the rollers 20. The rollers 20 are rotatable on coaxial shafts 21 fixed to arms 22 fixed to and extending upwardly from a transverse shaft 23 journaled in brackets 24 attached to the rail 9 adjacent its pivotal connections to the rails 1. Single glass sheets or a pair of superposed pre-cut glass sheets may be placed on the mold with opposite ends resting upon the cross rail 3 at the end of the section A and the portion 11 of the marginal rail 9 of the section B causing the outer end of the section B formed by the portion 11 of the glass engaging rail to move downwardly and the pivotally connected ends of the two sections A and B to move upwardly until the ends of the rails 1 adjacent the pivots 14 engage the under side of the glass.

The pivotal connections are so disposed that the glass engaging portions of the mold are substantially in a horizontal plane when supporting the rigid glass sheets. As the glass is softened by heat it sags and imposes more weight on the portion of the mold adjacent the pivots 14, causing the pivoted ends of the mold sections to move downwardly to the molding position while the section B swings upwardly.

For convenience in initially positioning the glass, the rail 3 may be provided with laterally spaced lugs 25 which are attached to the outer face of the rail and project above the top face thereof.

As indicated above, when an end of the mold is very steeply inclined in the closed position there may be a tendency for the ends of the heat-softened glass sheets to curl inwardly out of contact with the end of the mold shaping surface when the mold reached its closed position shown in solid lines in FIGURES 1 and 2. Accordingly, two improved hold downs D embodying the present invention have been provided for engaging the top face of the window glass being bent as the mold approaches its closed position to hold the glass in contact with the end of the mold shaping surface. In FIGURES 1 and 2, two identical hold down devices D are shown attached to the portion 11 of the rail 9 for engaging the glass at laterally spaced points.

Each hold down D has a channel bar 26 attached to the outer side of the portion 11 of the rail 1 and disposed at right angles to the top edge 10 of the rail, terminating short of the top edge 10. Pivotally connected to the channel bar 26 are parallel links 27 which are mounted on pivot pins 28 which extend through the ends of the links 27 and through the walls of the channel bar 26. The pivot pins 28 may be secured by means of cotter pins as shown in FIGURE 3.

Each link 27 is pivotally connected at its opposite end to a movable carrier bar 29 having two spaced wall portions 30 and a central web portion 31. The links 27 are connected to the carrier bar 29 by pivot pins 32 passing through the wall portions 30 as shown in FIGURES 3 and 5, and held in place by cotter pins. Thus, the carrier bar 29 is pivotally mounted for shifting movement relative to the end section B and remains generally parallel to the channel bar 26 throughout its range of movement.

The carrier bar 29 has a cylindrical forward extension 33 adapted to receive a laterally swinging depending arm 34 which carries a loosely mounted glass-engaging shoe 35. The arm 34 is retained on the extension 33 by a pin 36 which passes through the cylindrical extension 33 adjacent the arm 34 and extends outwardly therefrom at one side to provide a stop which limits the pivotal movement of the arm 34. The arm 34 has a projecting portion 37 which engages pin 36 when the arm 34 is pivoted to the position shown in dashed lines in FIGURE 4. This permits the arm 34 to be held outwardly of the end section B when the glass sheets are being loaded on the mold.

The glass engaging shoe 35 may be in the form of a U-shaped channel having an opening in each side wall to receive the arm 34 and may be secured to the arm 34 by suitable means such as cotter pins extending through the arm 34 adjacent the walls of the shoe 35. The shoe 35 is preferably formed of a poor heat conducting material, capable of resisting the heat to which the glass is subject in bending. It is supported loosely on the arm 34 so that it can readily accommodate itself to the glass surface.

Pivotally attached to the end of the channel bar 26 below the portion 11 of the rail 1 is a lever 38. The lever is attached to the channel bar 26 by a pivot pin 39 which extends through the side walls of the channel bar 26 and may be secured by means of cotter pins. The upper end of the lever 38 extends through an opening 40 in the web portion 31 of the carrier bar 29 and movement of the lever 38 causes the end of the lever to engage the web portion 31 adjacent the opening 40 to move the carrier bar in response to pivotal movement of the lever 38.

At the lower end of the lever 38 is a counter weight 41, so disposed that when the end section B is in its open glass-receiving position the carrier bar 29 is projected forwardly and the arm 34 and shoe 35 are held at a considerable distance above the marginal glass-engaging surface of the mold. To facilitate the placing of the glass on the mold the arm 34 may be swung laterally on the cylindrical extension 33 to a position clear of the end portion 11 of the mold upon which the glass is to be placed. As the mold approaches the closed position, the counter weight 41 moves through the vertical plane of its pivot axis and reverses the thrust on the carrier bar 29 to cause the carrier bar 29 to move in a direction to press the shoe 35 lightly against the glass and hold it against the end of the mold. Pressure exerted on the ends of the glass sheets by the hold down D at the time end section B is brought to molding position insures the proper engagement of the ends of the glass sheets with the ends of the mold section B and prevents separation of the superposed glass sheets at their outer ends.

FIGURES 6, 7 and 8 show hold down devices embodying the invention as used with a full windshield bending mold similar to those shown in my U.S. Patent No. 3,103,430. The mold generally comprises a main section A', two end sections B' hinged to the main section A' and each being pivotable about a movable axis, a cradle C' which supports the sections A' and B' and two hold downs D, one of which is mounted at the end of each end section B'.

The structure of the sections is substantially identical to the structure of the sections of the half windshield mold shown in FIGURES 1 and 2. The end sections B' are supported on the cradle C' by links 42 which provide for rocking movement of the sections B' between an open glass receiving position shown in solid lines in FIGURE 6 and a closed molding position shown in dashed lines in FIGURE 6.

The end sections B' become increasingly narrow at their outer ends as shown in FIGURE 7 so that the glass sheets to be bent will form an automobile windshield or rear window with an apex at each end. The tendency of the heat-softened glass sheets to curl inwardly from the molding surface when the mold collapses to its closed molding position will therefore be rather severe due to the small weight imposed in a direction normal to the surface of the glass. A hold down D is therefore provided at each end of the mold right at the apex of each end section.

When the glass sheets are to be loaded on the open mold, the depending arms 34 of the hold downs D are swung outwardly to permit clear access to the molding surface. When the glass sheets are in position the arms 34 are swung inwardly to the position shown in solid lines in FIGURE 6. At this point, the counterweight 41 is inwardly of the vertical plane of the axis of the lever 38, and the lever 38 will hold the hold down D away from the surface of the glass.

As the end sections B' move upwardly to their closed molding position, the counterweight 41 moves outwardly of the vertical plane of the axis of the lever 38 and reverses its thrust on the carrier bar 29 to press the glass engaging shoe 35 against the surface of the heat-softened glass as shown in dashed lines in FIGURE 6. This insures the proper engagement of the ends of the glass sheets with the ends of the mold end sections B' and prevents separation of the superposed glass sheets.

It is to be understood that the above description and drawings are by way of illustration, rather than limitation, and that variations and modifications of the specific device herein shown and described may be made without departing from the spirit of the invention.

What I claim is:

1. In a collapsible bending mold for forming heat-softened glass sheets, an end section mounted to swing vertically about a horizontal axis and having an outer end provided with a face that engages the under side of a glass sheet to be bent and that swings upwardly from a glass receiving position to a molding position, a glass retaining member located on the outer end of said end section and movable between a glass engaging position and a second position spaced from the glass, link means movably mounting said member to said end section, a lever pivotally mounted on said end section to swing vertically about a transverse axis intermediate its ends, a counterweight connected to said lever below its axis, means connecting the upper end of said lever to said glass retaining member whereby the upper end of said lever applies a thrust holding said member in its second position while said end section is in its glass receiving position and a reverse thrust moving said member to its glass retaining position as said end section approaches its upward molding position.

2. In a collapsible bending mold for forming heat-softened glass sheets, an end section mounted to swing vertically about a horizontal axis and having an outer end provided with a face that engages the under side of a glass sheet to be bent and that swings upwardly from a glass receiving position to a molding position, a glass retaining member located on the outer end of said end section and movable between a glass engaging position and a second position spaced from the surface of the glass, a plurality of links pivotally connected at one end to the outer end of said mold and at the other end to said glass retaining member, a lever pivotally mounted on said end section to swing vertically about a transverse axis intermediate its ends, a counterweight connected to said lever below its axis, means connecting the upper end of said lever to said glass retaining member whereby said lever exerts a thrust on said glass retaining member to move the same to its glass engaging position as said end section swings upward to its molding position, and exerts a reverse thrust on said glass retaining member to move the same to its second position when said end section is in its glass receiving position.

References Cited by the Examiner
UNITED STATES PATENTS 3,003,286  10/1961  Richardson _____ 65—107
3,103,430   9/1963  Jendrisak _____ 65—290

DONALL H. SYLVESTER, *Primary Examiner.*